United States Patent [19]
Yousif et al.

[11] Patent Number: 6,082,566
[45] Date of Patent: Jul. 4, 2000

[54] RESEALABLE LINER AND INDUCTION SEAL COMBINATION

[75] Inventors: Bahjat Z. Yousif, Elmhurst; Paul Yousif, Wheaton; Sue A. Ross, Elmhurst; Nicena Guevara, Roselle, all of Ill.

[73] Assignee: Tech Seal Products, Inc., Roselle, Ill.

[21] Appl. No.: 09/162,271

[22] Filed: Sep. 29, 1998

[51] Int. Cl.[7] .................................................. B65D 53/04
[52] U.S. Cl. .......................... 215/232; 215/347; 428/66.3; 428/66.4; 428/484
[58] Field of Search .................. 428/66.3, 66.4, 428/484; 215/347, 232

[56] References Cited

U.S. PATENT DOCUMENTS

| 4,596,338 | 6/1986 | Yousif | 215/232 |
| 5,712,042 | 1/1998 | Cain | 428/458 |

*Primary Examiner*—Alexander Thomas
*Attorney, Agent, or Firm*—Marshall, O'Toole, Gerstein, Murray & Borun

[57] ABSTRACT

A resealable liner and induction seal combination is disclosed. The combination has a transparent, removable, tamper-evident inner seal for a container and a liner that remains within a closure to provide a resealable, chemically resistant closure for the container.

12 Claims, 1 Drawing Sheet

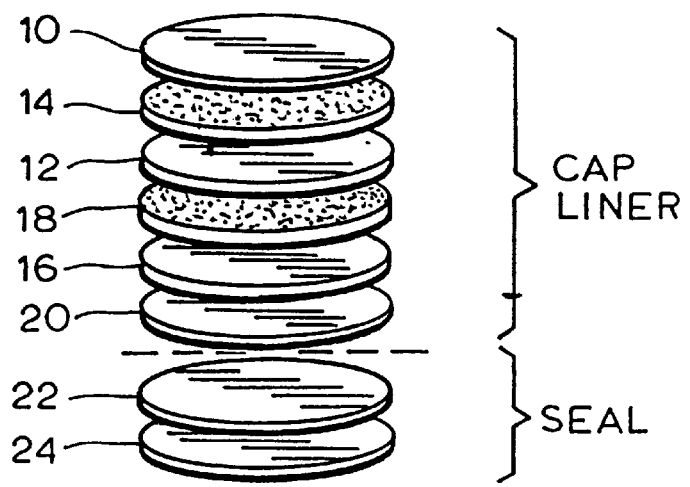
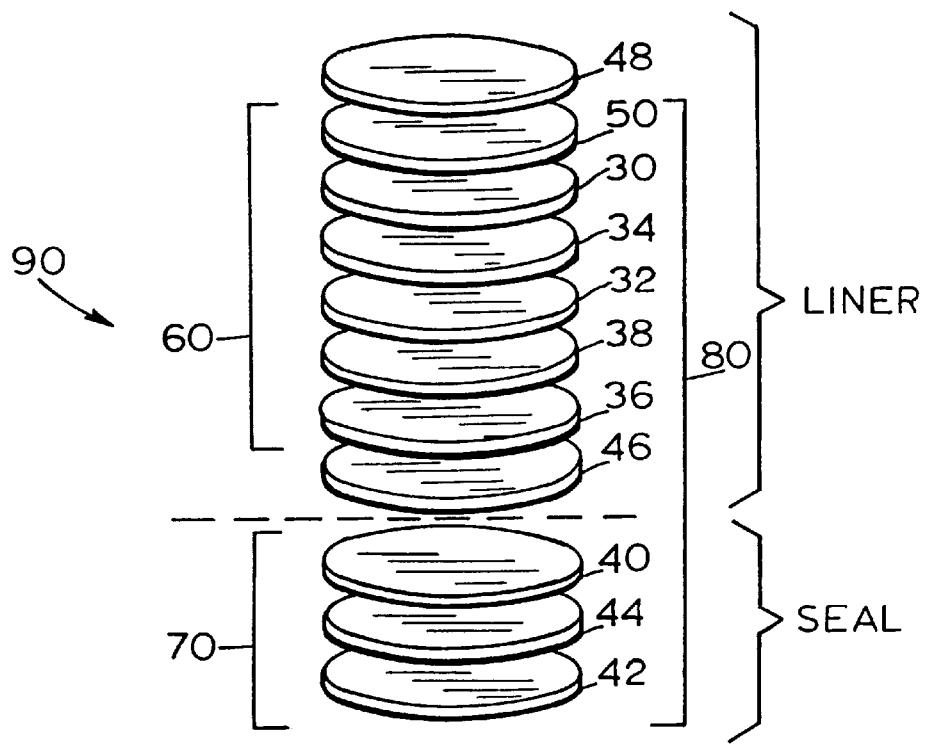

RESEALABLE LINER AND INDUCTION SEAL COMBINATION

FIELD OF THE INVENTION

The present invention relates to the field of resealable inner seal and liner combinations for containers. More particularly, the present invention relates to an improved cap lining material suitable for use with conventional induction heating/cap sealing techniques, wherein the inner seal is transparent and tamper-evident, and the liner portion remains within the cap to provide a chemical resistant, resealable liner for containers.

BACKGROUND OF THE INVENTION

It has been common practice to line closures for containers with a laminated material having a layer of pulp mounted to a layer of aluminum foil by an intermediate wax layer. The laminated material also contains a layer of polyester film fixed by an adhesive to the foil, and a film of sealing material fixed by an adhesive to the polyester layer. The laminate is produced and shipped in roll form, which are die cut into discs, then mounted in the container cap with a hot melt adhesive or by a friction fit.

The resulting lined caps are torqued onto a container, like a bottle or jar, filled with a fluid or solid product. The capped container then is passed through a high frequency induction heating unit. During induction heating, the aluminum foil is heated to a temperature in excess of about 300° F., which melts the wax in the layer between the pulp and aluminum foil. The sealing material is selected to match the material of construction of the container, and is heat welded or sealed to the rim of the container during induction heating. When the consumer removes the cap from the container, the pulp is removed with the cap, leaving the foil, polyester film, and sealing material on the container to provide evidence of tampering and to prevent leakage and contamination.

One such liner/seal combination is disclosed in Yousif U.S. Pat. No. 4,596,338. The liner/seal combination disclosed in that patent provides an air-permeable paper seal to overcome problems associated with pressure changes within the container due to changes in temperature. Another liner/seal combination is disclosed in Cain U.S. Pat. No. 5,712,042, which also discloses a paper layer as the seal.

Each prior art linear/seal combination contains several layers of laminates, wherein laminates forming the seal form a tamper-evident seal. However, the prior art combinations do not allow consumers to observe or inspect the contents of the container because the seals are not transparent. It would be desirable to provide a liner/seal combination that provides a transparent seal thereby allowing a consumer to observe or inspect the contents of the container before the tamper-evident seal is removed. The present invention is directed to such liner/seal combinations.

SUMMARY OF THE INVENTION

The present invention is directed to new and improved liner/seal combinations for use in induction heat sealing techniques. In particular, the present liner/seal combinations provide a transparent inner seal for a container and a liner portion that remains inside a closure, like a screw cap, to provide a chemically resistant, resealable liner to the container. The seal and liner also provide barriers that keep oxygen, water vapor, and other contaminants from entering the container.

The inner seal protects the product stored in the container, provides evidence of tampering, and prevents leakage during storage and transportation. The transparent inner seal allows the consumer to observe or inspect the contents of the container, and is removed by the consumer prior to using the product in the container.

Therefore, one aspect of the present invention is to provide a liner/seal combination that can be positioned within a closure for containers containing pharmaceutical, medicinal, food, and industrial products, either liquid or solid.

Another aspect of the present invention is to provide a liner/seal combination that can be used with an induction heating apparatus.

Another aspect of the present invention is to provide a liner/seal combination for closures, wherein the liner/seal combination has laminated layers, such that products packaged in containers are protected from contamination and provide tampering evidence, and such that the contents of the container can be observed or inspected prior to removing the tamper-evident seal. This aspect of the invention is achieved by providing a liner/seal combination for closures that utilizes a thermoplastic polymer film and a heat sealant film as the transparent sealing portion of the liner/seal combination. The liner/seal combination also utilizes an absorbent synthetic fabric layer that absorbs a wax adhesive that bonds the sealing portion of the combination to the liner portion of the combination. When the closure is removed from the container, the absorbent synthetic fabric layer and absorbed wax remain in the closure as components of the liner portion of the liner/seal combination.

Another aspect of the present invention is to provide a chemically resistant liner by laminating a synthetic fabric layer and a chemically resistant polymer film on the aluminum foil, and to provide a transparent seal for the container.

These and other aspects and features of the present invention will become apparent from the following detailed description of the preferred embodiments taken in conjunction with the figures.

BRIEF DESCRIPTION OF THE DRAWINGS

FIG. 1 is an exploded view of a liner/seal combination disclosed in Yousif U.S. Pat. No. 4,596,338; and FIG. 2 is an exploded view of a liner/seal combination of the present invention.

DETAILED DESCRIPTION OF THE PREFERRED EMBODIMENTS

FIG. 1 illustrates an exploded view of an induction cap liner of the prior art. Particular dimensions of the various layers disclosed herein are included for the purposes of illustration only. Persons skilled in the art are well aware of the particular dimensions required for the various end applications of the liner/seal combination.

The structure in FIG. 1 has a layer of pulp 10 to which a layer of aluminum foil 12 is secured by an adhesive 14. A first layer of paper 16, such as a 30–60 pound bleached white kraft paper, is secured by adhesive 18 to foil 12. A layer of wax 20 is used to secure a layer of water and/or oil proofed air-permeable paper 22 to the first layer of paper 16. The air-permeable paper layer 22 is coated with a heat sealing layer 24. The material of construction for sealing layer 24 is identical to the material of construction of the bottle, e.g., a polyvinyl chloride container requires a polyvinyl chloride sealing layer, or a polyethylene container requires a polyethylene sealing layer.

When a capped container having a prior art foil seal cap liner is passed through an induction heater, aluminum foil layer 12 is heated sufficiently to melt wax layer 20 which is absorbed into first paper layer 16. The structure delaminates at the dashed line of FIG. 1 such that the portion above the dashed line becomes the cap liner and the portion below the dashed line becomes the container seal as the sealing layer 24 is heat welded to the rim of the container. Another prior art cap liner/seal combination is disclosed in FIG. 1 of Yousif U.S. Pat. No. 4,596,338, incorporated herein by reference. That cap liner/seal combination also utilizes a wax layer to delaminate the cap liner from the cap seal during induction heating. In these prior art liner/seal combinations, the paper which forms the seal is woven, and, therefore, opaque. Accordingly, the contents of the container cannot be inspected until after the seal is removed from the container.

An induction liner/seal combination 90 of the present invention is illustrated in FIG. 2 and has a laminated construction. In general, a layer of aluminum foil 30 is laminated to a layer, or a film, of a chemically resistant polymer 32 by an adhesive 34, and a layer of nonwoven, synthetic fabric 36 is laminated to a surface of chemically resistant polymer 32 opposite from aluminum foil layer 30 by an adhesive 38, to form a structure 60. Structure 60, together with a support material 48, comprises the liner portion of a liner/seal combination 90.

Separately, a layer of a thermoplastic film 40 is laminated to a layer of a heat sealant film 42 by an adhesive 44 to form a structure 70. Structure 70 is the seal portion of liner/seal combination 90. Structure 60 and structure 70 then are bonded together by a layer of wax 46. The resulting structure 80 then is laminated to support material 48 by an adhesive 50 such that aluminum foil 30 is adjacent to adhesive 50, thereby forming liner/seal combination 90.

In accordance with the present invention, the seal portion of the combination comprises structure 70, i.e., thermoplastic film 40 laminated to heat sealant film 42. The liner portion of the combination comprises support material 48 and structure 60, i.e., aluminum foil layer 30, chemical-resistant polymer film 32, and synthetic fabric 36, into which wax layer 46 has melted. Support material 48 can be, for example, pulpboard, paperboard, or a polyolefin foam or solid.

In accordance with another important feature of the invention, the seal portion of the combination, which comprises thermoplastic film 40 and heat sealant film 42, is free of a woven paper layer and an aluminum foil layer, and is transparent.

Thermoplastic film 40 can be constructed of a polyethylene (high, medium, or low density), an LDPE copolymer (e.g., copolymerized with an ionomer, acetate, or acrylate, like methyl methacrylate or acrylic acid), a polyethylene copolymer (e.g., EVA, EAA, EMMA, EMM), a polyetheretherketone, an acrylonitrile, a nylon, a polybutylene, a polyester (e.g., PET), polybutylene terephthalate (PBT), a polyetherimide, an ionomer, a polyimide, a polypropylene, a styrene-butadiene copolymer, a polyvinyl chloride (PVC), or a polyvinylidene chloride (PVdC). Variations of such polymers, like PVdC coated polyester, PVdC coated polypropylene, or an acrylic coated polypropylene, also can be used.

Chemically resistant film 32 can be constructed of these same materials. Thermoplastic film 40 and chemically resistant film 36 can be of the same or different materials of construction.

Heat sealant film 42 can be constructed from a polyethylene, a polyethylene copolymer, a polypropylene, an ionomer, or blends thereof. Typically, heat sealant film 42 is constructed from the same material of construction as the container to which the liner/seal combination is attached.

The layer of synthetic fabric 36 remains in the liner portion of the liner/seal combination, and is the layer that comes into direct contact with the contents of the container after the seal is removed. The synthetic fabric, therefore, typically is capable of resisting attack by the contents of the container, which avoids contamination of the contents of the container and helps provide a chemically resistant liner.

The synthetic fabric of layer 36 paper is nonwoven, and is not a standard cellulose-based paper. The synthetic fabric can be a polyethylene, a polyester, a polypropylene, a rayon, a nylon, or mixtures thereof. Examples of synthetic fabrics or papers that can be used include, but are not limited to, TYVEK® nonwoven polyethylene fabrics, SONTARA® polyester blend fabrics, and spunbond nonwoven polypropylene fabrics.

The wax layer (46) comprises paraffin, micro-crystalline wax, polyethylene wax, polyisobutylene resins, butyl rubber resins, or polyamides, for example. Various waxes improve tack and cohesive strength.

A typical liner/seal combination of the present invention comprises a 0.030 inch layer of support material 48, a one mil layer of aluminum foil 30, and 1.5 mil layers of chemically resistant polymer 32, thermoplastic film 40, and heat seal 42. The liner/seal utilizes a wax layer 46 of about 1 mil thickness and a synthetic fabric layer of about 5 to about 10 mil in thickness. Synthetic fabric layer 36 absorbs wax layer 46 when the wax is melted during induction heating.

The liner/seal combinations of the present invention are manufactured to full machine width in a master roll form. The master roll of liner/seal combination then is slit to a desired width, and shipped to a closure manufacturer. The closure manufacturer in turn die cuts the master roll to the appropriate size for a particular closure and container. The die cut liner/seal combination is inserted into the closures, and the closures then are applied to the containers. The closed container next is passed through an induction sealing device. During the process of induction sealing, wax layer 46 melts and is absorbed into synthetic fabric layer 36, and the heat seal portion 70 of the liner/seal combination separates from the liner portion 60. The heat seal portion 70 forms a transparent, tamper-evident membrane on the opening of the container. This membrane is removed by the consumer and discarded. The liner portion 60 of the combination remains in the closure to provide a chemically resistant seal for the container and its contents.

A present liner/seal combination has the advantage of providing a seal containing thermoplastic film 40 and heat seal 42. This seal is transparent, thereby allowing consumers to observe and inspect the contents of the container prior to removing the tamper-evident seal from the container. In addition, aluminum foil layer 30 in liner portion 60 is covered with chemically resistant polymer film 32 and synthetic fabric 36, thereby protecting the liner portion 60 of the liner/seal combination from attack by contents in the container. The liner portion 60 also permits complete resealing of the closure to the neck of the container, thereby protecting the contents of the container from contamination and preventing leaks.

EXAMPLE

A 48-gauge PET film (32) was laminated to a 1 mil thick aluminum foil (30) using a commercial high performance adhesive (34). The PET side of the PET/aluminum foil laminate was laminated to a film of TYVEK® (36) (5 mil thickness). Huntsman Film PL-79 (42), an EMA film available from Huntsman, was laminated to a 48-gauge PET (40) using Morton Adhesive 76×126 (44). Next, the TYVEK® /PET/aluminum foil laminate was laminated to the PET/PL-79 laminate using a hot melt adhesive (46) (i.e., MICROBOND 8014 available from IGI) such that the PET and TYVEK are in contact. The resulting structure was laminated to 0.030″ pulp (48), using Morton Adhesive PF-51) (50) such that the aluminum foil is in contact with the pulp. This structure then was subjected to pressure for about twenty-five hours to insure sufficient bonding between the laminated layers. The resulting liner/seal combination had the following structure:

Pulp/Aluminum Foil/PET film/TYVEK® /Wax/PET/ Huntsman Film PL-79.

Die cuts of the combination were inserted into 35 mm closures and heat sealed onto the polyethylene and polypropylene jars. The resulting seals were transparent and completely sealed the containers. The liners effectively resealed the container.

Obviously, many modifications and variations of the invention as hereinbefore set forth can be made without departing from the spirit and scope thereof, and, therefore, only such limitations should be imposed as are indicated by the appended claims.

What is claimed is:

1. A laminated container cap liner and seal combination comprising:

a layer of a support material, a layer of aluminum foil adhesively secured to a surface of the support material, a layer of a chemically resistant polymer adhesively secured to a surface of the aluminum foil opposite from the support material, a layer of a synthetic fabric adhesively secured to a surface of the chemically resistant polymer opposite from the aluminum foil;

a layer of a transparent thermoplastic film secured to a surface of the synthetic fabric opposite from the chemically resistant polymer by a layer of wax, a layer of a heat seal adhesively secured to a surface of the thermoplastic film opposite the synthetic fabric, such that upon heating of said layer of aluminum foil to above about 300° F., the layer of wax melts and is absorbed by the synthetic fabric, and the layer of transparent thermoplastic film and the layer of heat seal are sealed to a rim of a container by the heat seal.

2. The combination of claim 1 wherein the transparent layer of thermoplastic film is selected from the group consisting of a polyethylene, a polyethylene copolymer, a polyetheretherketone, a polyacrylonitrile, a nylon, a polybutylene, a polyester, a polyethylene terephthalate, a polybutylene terephthalate, an ethylenevinyl acetate, a polyetherimide, an ionomer, a polyimide, a polypropylene, a poly(styrene-butadiene), a polyvinyl chloride, a polyvinylidene chloride, a PVdC coated polyester, a PVdC coated polypropylene, an acrylic coated polypropylene, and blends thereof.

3. The combination of claim 1 wherein the layer of chemically resistant polymer is selected from the group consisting of a polyethylene, a polyethylene copolymer, a polyetheretherketone, a polyacrylonitrile, a nylon, a polybutylene, a polyester, a polyethylene terephthalate, a polybutylene terephthalate, an ethylenevinyl acetate, a polyetherimide, an ionomer, a polyimide, a polypropylene, a poly(styrene-butadiene), a polyvinyl chloride, a polyvinylidene chloride, a PVdC coated polyester, a PVdC coated polypropylene, an acrylic coated polypropylene, and blends thereof.

4. The combination of claim 1 wherein the synthetic fabric is nonwoven.

5. The combination of claim 4 wherein the synthetic fabric is selected from the group consisting of a polyethylene, a polyester, a polypropylene, a rayon, a nylon, and mixtures thereof.

6. The combination of claim 1 wherein the wax is selected from the group consisting of a paraffin wax, a microcrystalline wax, a polyethylene wax, a polyisobutylene resin, a butyl rubber, and a polyamide.

7. The combination of claim 1 wherein the support material is selected from the group consisting of pulpboard, paperboard, and a polyolefin foam or sheet.

8. The combination of claim 1 wherein the layer of transparent thermoplastic film comprises polyethylene terephthalate.

9. The combination of claim 8 wherein the layer of chemically resistant polymer comprises polyethylene terephthalate.

10. The combination of claim 9 wherein the synthetic fabric comprises a nonwoven polyethylene.

11. The combination of claim 10 wherein the wax comprises a paraffin wax.

12. The combination of claim 11 wherein the heat seal comprises a polyethylene terephthalate.

* * * * *